US 8,583,041 B2

(12) United States Patent
Lee (10) Patent No.: US 8,583,041 B2
(45) Date of Patent: Nov. 12, 2013

(54) OPERATING METHOD AND APPARATUS FOR USER INTERFACE IN PORTABLE TERMINAL

(75) Inventor: Jin Gu Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 12/964,031

(22) Filed: Dec. 9, 2010

(65) Prior Publication Data
US 2011/0143666 A1  Jun. 16, 2011

(30) Foreign Application Priority Data

Dec. 15, 2009 (KR) .................. 10-2009-0124810

(51) Int. Cl.
*H04B 7/00* (2006.01)
(52) U.S. Cl.
USPC ............... 455/41.2; 455/418; 455/456.6

(58) Field of Classification Search
USPC ................ 455/41.1, 41.2, 418, 456.6
See application file for complete search history.

(56) References Cited

U.S. PATENT DOCUMENTS

| | | | |
|---|---|---|---|
| 2004/0198221 A1* | 10/2004 | Bin et al. ............ | 455/41.1 |
| 2006/0019720 A1* | 1/2006 | Kakehi ............... | 455/569.2 |
| 2007/0171091 A1* | 7/2007 | Nisenboim et al. ... | 340/825.69 |

* cited by examiner

*Primary Examiner* — Tuan H Nguyen
(74) *Attorney, Agent, or Firm* — Jefferson IP Law, LLP (57) ABSTRACT

An operating method for a user interface in a portable terminal and an apparatus thereof are provided. The operating method for a user interface in a portable terminal includes registering Bluetooth connection information in a phone book of the portable terminal, and displaying peripheral Bluetooth device information and phone book information on a screen indicating a searching result for peripheral Bluetooth devices. The method allows a user to easily and rapidly perform Bluetooth communication connection with another user trying performing Bluetooth communication upon using a Bluetooth communication function of the portable terminal.

17 Claims, 7 Drawing Sheets

OPERATING METHOD AND APPARATUS FOR USER INTERFACE IN PORTABLE TERMINAL

PRIORITY

This application claims the benefit under 35 U.S.C. §119 (a) of a Korean patent application filed on Dec. 15, 2009 in the Korean Intellectual Property Office and assigned Serial No. 10-2009-0124810, the entire disclosure of which is hereby incorporated by reference.

BACKGROUND OF THE INVENTION

1. Field of the Invention

The present invention relates to an operating method for a user interface in a portable terminal and an apparatus thereof. More particularly, the present invention relates to an operating method for a user interface in a portable terminal for operating a Bluetooth module.

2. Description of the Related Art

With its increased use, the portable terminal has become a modern person's necessity. Since its inception, the portable terminal has advanced and now provides various functions such as a music play function, a character message function, a photographing function, a moving image photographing function, and a Bluetooth communication function as well as the voice call function.

The Bluetooth communication function is a wireless communication function, based on near distance radio technology, which enables communication between Bluetooth devices located at a near distance. In general, Bluetooth communication is achieved by forming a piconet between a master device and one or more slave devices. The master device is a device requesting a communication connection and the slave device is the device receiving the request. A Bluetooth device functioning as the master device searches for Bluetooth devices with which it can communicate and selects a specific Bluetooth device among the searched communicable Bluetooth devices as a slave device to achieve the communication connection between the master device and the slave device. A plurality of Bluetooth devices may be selected as the slave device. In one piconet, seven slave devices can be connected.

To search for slave devices located near the master device and with which the master device can communicate, the master device sets a frequency hopping sequence to broadcast an inquiry signal. A slave device receiving the inquiry signal synchronizes with a frequency of the inquiry signal and transmits its Bluetooth device address BD_ADDR and clock information to the master device to be recognized as a communicable slave device.

The Bluetooth device broadcasting the inquiry signal searches for Bluetooth devices located nearby and displays them on a display unit. That is, the master device may display Bluetooth device addresses BD_ADDR of the slave devices on an inquiry list of the display unit. At this time, a user selects a specific device from among the displayed Bluetooth devices with which to perform Bluetooth communication. However, the user cannot intuitively recognize which Bluetooth devices are available based only on a Bluetooth device address BD_ADDR. Accordingly, there is an inconvenience in that the user cannot easily search for another specific Bluetooth device for Bluetooth communication execution.

SUMMARY OF THE INVENTION

An aspect of the present invention is to address the above-mentioned problems and/or disadvantages and to provide at least the advantages described below. Accordingly, an aspect of the present invention is to provide an operating method for a user interface in a portable terminal that may display phone book information together with an address of a Bluetooth device upon displaying an inquiry list with respect to peripheral Bluetooth devices, and an apparatus thereof.

In accordance with an aspect of the present invention, a portable terminal is provided. The portable terminal includes a Bluetooth module for transmitting an inquiry signal to perform an inquiry procedure for peripheral Bluetooth devices, a storage unit for storing peripheral Bluetooth device information acquired through the inquiry procedure of the Bluetooth module and phone book information including the peripheral Bluetooth device information, a display unit for displaying the peripheral Bluetooth device information searched through the inquiry procedure of the Bluetooth module together with phone book information, and a control unit for controlling the Bluetooth module to receive Bluetooth device information from at least one peripheral Bluetooth device and for controlling the display unit to simultaneously display the Bluetooth device information and the phone book information when Bluetooth device information corresponding to the peripheral Bluetooth device information is registered in the phone book information.

In accordance with another aspect of the present invention, an operating method for a user interface in a portable terminal is provided. The method includes registering Bluetooth connection information in a phone book of the portable terminal, and simultaneously displaying peripheral Bluetooth device information and phone book information on a screen indicating a searching result for peripheral Bluetooth devices.

In an operating method for a user interface in a portable terminal and an apparatus thereof according to an exemplary embodiment of the present invention, a user may easily and rapidly perform Bluetooth communication connection with another user performing Bluetooth communication upon using a Bluetooth communication function of the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a portable terminal is described in the present invention by way of example. However, the present invention is not limited thereto. Namely, the portable terminal as described herein may be considered descriptive of any terminal that includes a Bluetooth module. That is, the term "portable terminal" denotes any kind of information and communication device and includes a multi-media device such as a Portable Multimedia Player (PMP), a Personal Digital Assistant (PDA), an MP3 player, a portable game terminal, a wired or wireless telephone, a Smart Phone, and applications thereof.

Prior to a description of the present invention, a brief explanation of Bluetooth technology is provided. Bluetooth technology is fundamentally aimed at performing communication over a short distance, for example, within 10 m. This range can be increased to 100 m according to the applied output power. According to the Bluetooth standard, data transmission using Bluetooth has a maximum rate of 64 Kbps in the case of synchronous (voice) channel transmission and a maximum rate of 723.2 Kbps in the case of asynchronous (data) channel transmission. Further, because Bluetooth technology uses frequency-hopping spread spectrum technology, security is improved in comparison with other existing wireless communication protocols. Moreover, since Bluetooth technology can transmit voices as well as character data using Continuous Variable Slope Delta (CVSD) modulation, voice coding is improved.

As used herein, the term "inquiry" denotes an operation by a master device of broadcasting a signal (hereinafter referred to as an 'inquiry signal') searching for a Bluetooth device located nearby the master device with which to communicate. The master device broadcasts the inquiry signal using specific frequency channels among a plurality of frequency channels. The inquiry signal can include Bluetooth device address information BD_ADDR of the master device and clock information. In general, because the maximum number of searchable Bluetooth devices (hereinafter referred to as 'maximum searchable number') is set in a Bluetooth device, a Bluetooth device broadcasting the inquiry signal searches for as many Bluetooth devices as the maximum searchable number.

As used herein, the term "inquiry scan" denotes an operation by a slave device of scanning for an inquiry signal transmitted by a master device. The slave device selects one of a plurality of frequency channels and scans for an inquiry signal transmitted from the master device for a set time. When the slave device does not receive the inquiry signal for the set time, it changes a frequency channel to scan for the inquiry signal on a different frequency. When the transmission frequency channel of the master device is identical with the selected receiving frequency channel of the slave device, the slave device receives the inquiry signal of the master device. When the slave device receives the inquiry signal from the master device, it transmits an 'inquiry response' signal to the master device such that it can be recognized as a communicable Bluetooth device. The inquiry response signal contains name information of the slave device, Bluetooth device address information BD_ADDR, clock information, and class information of the device. For clarity of explanation of the present invention, it is assumed that the inquiry response signal contains device address information BD_ADDR and class information of the device.

Figure 1:
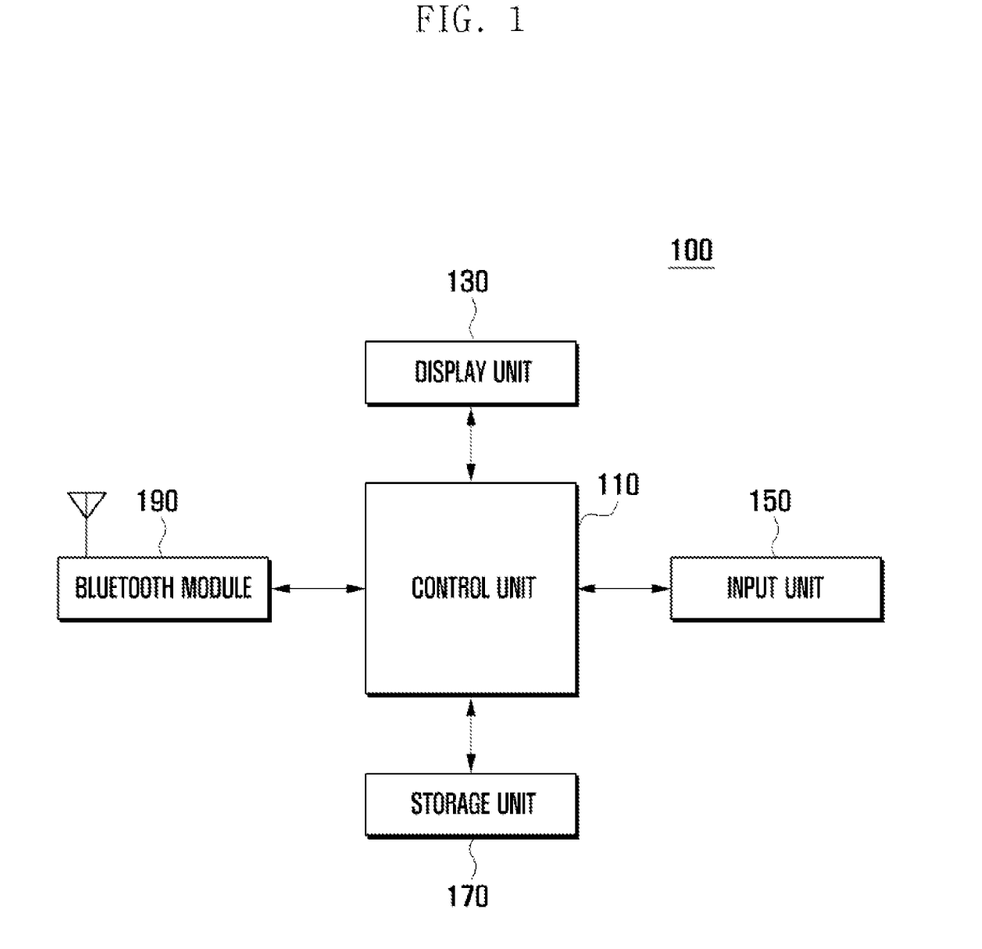
FIG. 1 is a block diagram schematically illustrating a configuration of a portable terminal according to an exemplary embodiment of the present invention.

FIG. 1 is a block diagram schematically illustrating a configuration of a portable terminal according to an exemplary embodiment of the present invention.

Referring to FIG. 1, the portable terminal 100 may include a display unit 130, an input unit 150, a storage unit 170, a Bluetooth module 190, and a control unit 110.

The portable terminal 100 having a construction as described above simultaneously displays a Bluetooth device address BD_ADDR and phone book information linked to the Bluetooth device address upon displaying an inquiry list, thereby increasing a recognition rate of a searched device and allowing a user to easily and rapidly perform Bluetooth communication connection with another user performing Bluetooth communication. A configuration and function of the portable terminal 100 according to an exemplary embodiment of the present invention will now be explained in more detail.

The display unit 130 outputs a screen activated according to function execution of the portable terminal 100. For example, the display unit 130 may output a booting screen, an idle screen, a menu screen, and a call screen. Namely, the display unit 130 may display all types of screens associated with states and operations of the portable terminal 100. A Liquid Crystal Display (LCD) or Organic Light Emitting Diodes (OLED) is applicable to the display unit 130. Further, the display unit 130 can be implemented by a touch screen system. In this case, the display unit 130 may simultaneously execute input and output functions. More particularly, the display unit 130 may display information regarding peripheral Bluetooth devices searched through an inquiry procedure of the Bluetooth module 190. That is, the display unit 130 may display Bluetooth device addresses BD_ADDR of the searched peripheral Bluetooth devices in the form of an inquiry list. Upon displaying the inquiry list, the display unit 130 may simultaneously display the Bluetooth device addresses BD_ADDR and phone book information when the peripheral Bluetooth devices are registered in the phone book information. Accordingly, when there is a Bluetooth device previously registered in the phone book among peripheral Bluetooth device information of the inquiry list, the user may recognize it intuitively.

The input unit 150 transfers a first input signal, for inputting various numerals and characters, and a second input signal, associated with setting and control of respective functions, to the control unit 110. The input unit 150 includes input keys for inputting the first and second input signals, and function keys. The function keys may include arrow keys, side keys, hot keys set to execute a specific function, and the like. The input unit 150 can be configured by one or a combination of a touch pad, a touch screen, a key pad of a general key arrangement, or a Qwerty key pad according to a provision pattern of the portable terminal 100. More particularly, the input unit 150 may receive an address of a specific Bluetooth device from a user and transmit it to the control unit 110. Namely, upon registering a specific Bluetooth device address BD_ADDR in the phone information, when a user selects a method of directly inputting the specific Bluetooth device address BD_ADDR, the user can input the address BD_ADDR using the input unit 150.

The storage unit 170 stores application programs necessary for operation of the portable terminal 100 and application programs necessary for supporting a call service, user data, and data necessary for operating the application programs. The storage unit 170 can be divided into a program area and a data area. The program area may store an Operating System (OS) for booting the portable terminal 100 and for operating the foregoing constructions, and application programs for operating various functions of the portable terminal 100, such as a web browser for accessing an Internet server, an MP3 application program for playing other sound sources, an image output application program for displaying and viewing photographs, and an application program and a game program for playing moving images. More particularly, a program area may store a Bluetooth program for executing a Bluetooth communication function and a phone book program for managing phone book information.

The data area stores all types of data created during use of the portable terminal 100. For example, the data area may store MP3 files, image files, and moving image files used in the application programs. More particularly, the data area may store phone book information. The phone book information may contain photograph information, name information, and phone number information. Further, the phone book information may include address information BD_ADDR of a specific Bluetooth device. Moreover, the data area may store peripheral Bluetooth device information acquired through an inquiry procedure of the Bluetooth module. The peripheral Bluetooth device information may contain addresses BD_ADDR of peripheral Bluetooth devices and class information of devices.

The Bluetooth module 190 performs a procedure for establishing a connection with a Bluetooth device under control of the control unit 110. Namely, when the portable terminal 100 is a master device, the Bluetooth module 190, under the control of the control unit 110, transmits an inquiry signal and a page signal to peripheral devices. The inquiry signal and the page signal contain Bluetooth device address information BD_ADDR of the Bluetooth module 190 and clock information. The inquiry signal and the page signal are transmitted in the form of an ID packet. When the portable terminal 100 is a slave device, the Bluetooth module 190 executes an inquiry scan and a page scan under the control of the control unit 110. The Bluetooth module 190 in an inquiry scan state scans an inquiry signal received from the master device. Upon receiving the inquiry signal, the Bluetooth module 190 transmits an inquiry response signal to the master device. The Bluetooth module 190 in a page scan state scans a page signal received from the master device. Upon receiving the page signal, the Bluetooth module 190 transmits a page response signal to the master device.

The control unit 110 controls power supplied to the foregoing constructions, and controls an overall operation of the portable terminal 100. Further, the control unit 110 may control signal flow between respective structural elements in the portable terminal 100. Namely, the control unit 110 may control the signal flow between respective structural elements in the portable terminal 100 such as the display unit 130, the input unit 150, the storage unit 170, and the Bluetooth module 190. The control unit 110 may also control the Bluetooth module 190 to broadcast an inquiry signal and to receive an inquiry response signal from at least one peripheral Bluetooth device. The control unit 110 may store peripheral Bluetooth device information in the storage unit 170 based on the inquiry response signal received from the peripheral Bluetooth devices. In addition, the control unit 110 may add the peripheral Bluetooth device information to specific phone book information to store it in the storage unit 170 according to a user operation. In this case, the control unit 110 may directly receive the Bluetooth device information to be added to the specific phone book information from a user through the input unit 150 according to a user operation.

The control unit 110 may control the display unit 130 to display information regarding the peripheral Bluetooth device transmitting the inquiry response signal in a form of an inquiry list. Moreover, the control unit 110 may compare the peripheral Bluetooth device information with Bluetooth device information registered in phone book information. At this time, when Bluetooth device information corresponding to the peripheral Bluetooth device information is registered in the phone book information, the control unit 110 may control the display unit 130 to simultaneously display the peripheral Bluetooth device information and the phone book information.

A construction and a function of a portable terminal according to an exemplary embodiment of the present invention were explained with reference to FIG. 1. Hereinafter, an operating method for a user interface in a portable terminal according to an exemplary embodiment of the present invention, namely, a method for searching for peripheral Bluetooth devices and a connecting method between Bluetooth device addresses and phone book information will be described in more detail with reference to the drawings.

First, an exemplary method for searching for peripheral Bluetooth devices will be described with reference to the accompanying drawings.

Figure 2:
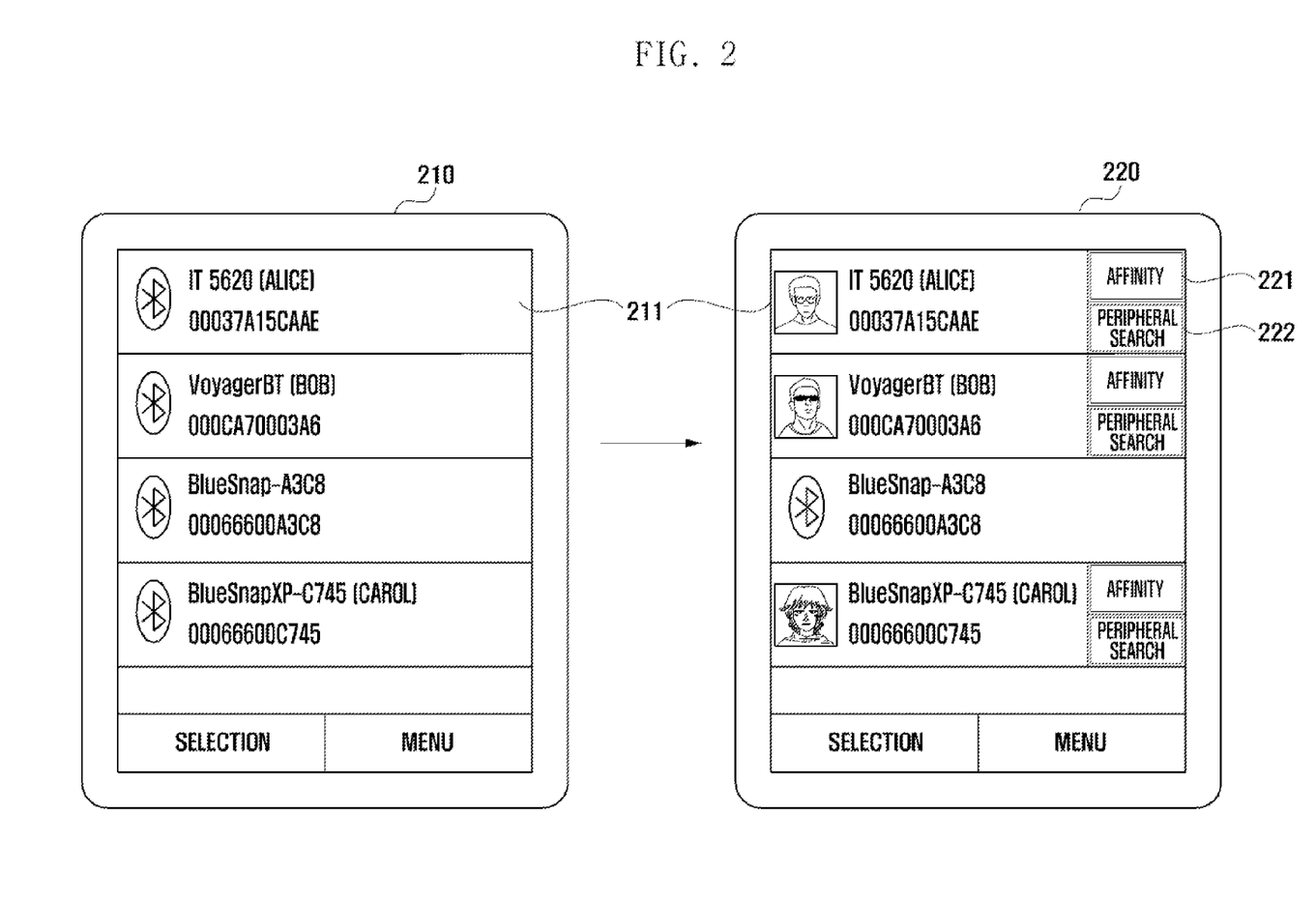
FIG. 2 is a view illustrating a search screen for peripheral Bluetooth devices of a portable terminal according to an exemplary embodiment of the present invention.

FIG. 2 is a view illustrating a search screen for peripheral Bluetooth devices of a portable terminal according to an exemplary embodiment of the present invention.

Figure 3:
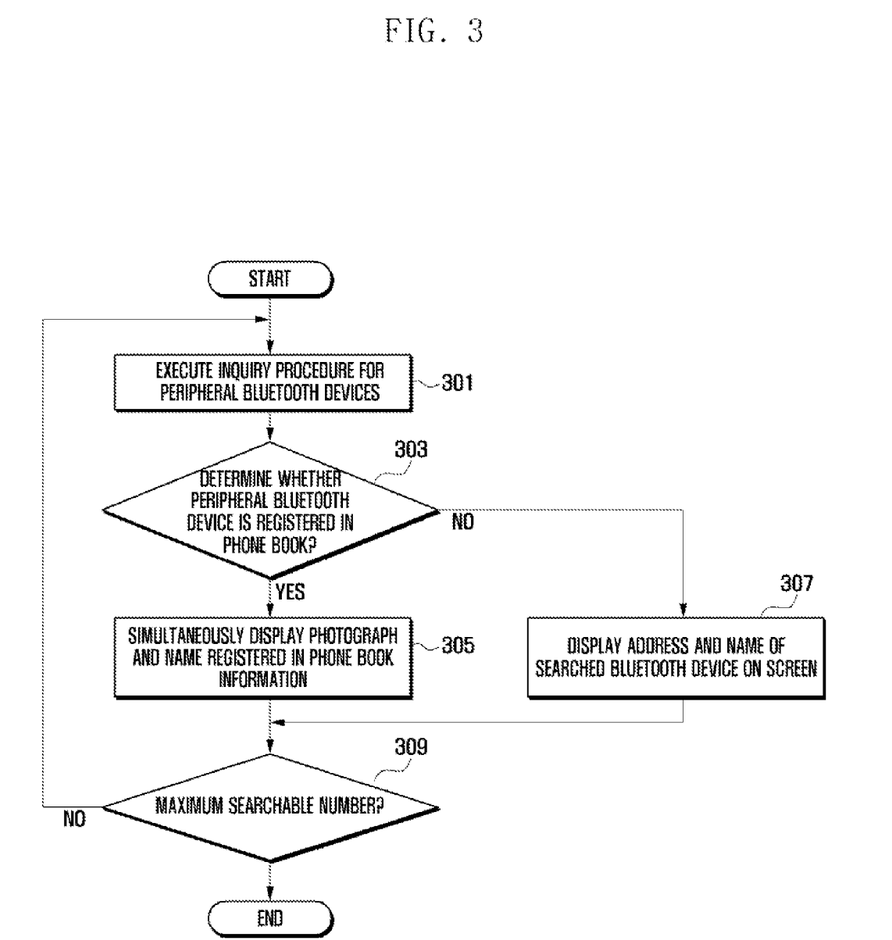
FIG. 3 is a flowchart illustrating a method for displaying a search screen for peripheral Bluetooth devices of a portable terminal according to an exemplary embodiment of the present invention.

FIG. 3 is a flowchart illustrating a method for displaying a search screen for peripheral Bluetooth devices of a portable terminal according to an exemplary embodiment of the present invention.

Referring to FIG. 2, a search screen 210 for peripheral Bluetooth devices of a portable terminal is divided into a plurality of fields 211, and peripheral Bluetooth device information acquired by an inquiry procedure of a Bluetooth module 190 can be displayed on respective ones of the plurality of fields 211. The control unit may control to display a Bluetooth logo within each field 211, for example on the left side of each field 211, and to display name information and address information BD_ADDR of searched peripheral Bluetooth devices also within each field 211, for example at a right side of the Bluetooth logo.

A search screen 220 for peripheral Bluetooth devices of the portable terminal can be displayed so that a user can intuitively recognize when a Bluetooth device, which is registered in a phone book of the portable terminal, is found as part of the inquiry search. That is, the control unit may control to display phone book information corresponding to Bluetooth devices that are registered in the portable terminal 100 instead of the Bluetooth logo. For example, photograph information of the phone book information may be displayed instead of the Bluetooth logo. Further, the control unit may control to display name information of the phone book information corresponding to Bluetooth devices that are registered together with name information of the Bluetooth device. Moreover, the control unit may display a first menu 221 corresponding to an affinity program and a second menu 222 corresponding to a peripheral searching program in the field 211 in which Bluetooth device information registered in the phone book is displayed. The affinity program and the peripheral searching program are explained in more detail with reference to FIG. 6 and FIG. 7.

Referring to FIG. 2 and FIG. 3, a control unit may control a Bluetooth module to execute an inquiry procedure for peripheral Bluetooth devices in step 301. As part of the inquiry procedure, the Bluetooth module broadcasts an inquiry signal for searching for communicable Bluetooth devices located nearby and may change to one of a plurality of frequency channels to broadcast the inquiry signal. The inquiry signal may include device address information BD_ADDR and clock information. When the Bluetooth module 190 receives an inquiry response signal from a peripheral Bluetooth device, the control unit can proceed to step 303.

In step 303, the control unit may determine whether the peripheral Bluetooth device is registered in a phone book based on address information BD_ADDR of a Bluetooth device included in an inquiry response signal received from the peripheral Bluetooth device. That is, the control unit may compare address information BD_ADDR of a Bluetooth device included in an inquiry response signal with address information BD_ADDR of a Bluetooth device registered in the phone book to identify whether there is corresponding information. When it is determined in step 303 that address information BD_ADDR of a Bluetooth device corresponding to the address information BD_ADDR of a Bluetooth device included in the phone book is registered in the phone book, the control unit proceeds to step 305.

In step 305, the control unit may add a field 211 displaying the Bluetooth device information to a search screen 220 for the peripheral Bluetooth devices and control to display the peripheral Bluetooth device information searched at step 301. For example, the control unit may control to display photograph information of phone book information in which the Bluetooth devices are registered in the field 211. Further, the control unit may control to display name information and address information BD_ADDR of searched peripheral Bluetooth devices, and name information of phone information in which the Bluetooth devices are registered near the photograph information. Moreover, the control unit may display a first menu 221 corresponding to an affinity program and a second menu 222 corresponding to a peripheral searching program also in the field 221.

In step 309, the control unit may determine whether the amount of peripheral Bluetooth device information displayed becomes a maximum searchable number. When it is determined in step 309 that the amount of peripheral Bluetooth device information displayed becomes a maximum searchable number, the control unit may terminate the procedure of FIG. 3. On the other hand, when it is determined in step 309 that the amount of peripheral Bluetooth device information displayed does not become the maximum searchable number, the control unit returns to step 301 and performs subsequent steps.

On the other hand, when it is determined in step 303 that address information BD_ADDR of a Bluetooth device corresponding to that included in the inquiry response signal is not registered in the phone book, the control unit may proceed to step 307. In step 307, the control unit may add a field 211 displaying the Bluetooth device information to a search screen 420 for the peripheral Bluetooth devices and control to display the peripheral Bluetooth device information searched at step 301. Namely, the control unit may control to display a Bluetooth logo in the field 211. In addition, the control unit may control to display name information and address information BD_ADDR of the searched peripheral Bluetooth devices near the Bluetooth logo.

As described above, in an exemplary method for displaying a search screen 220 for peripheral Bluetooth devices by a portable terminal, when the peripheral Bluetooth device information is registered in the phone book, the peripheral Bluetooth device information may be displayed together with the phone book on a search screen 220 indicating a search result with respect to peripheral Bluetooth devices. Accordingly, the displaying method allows a user to easily and rapidly search for a specific user performing Bluetooth communication from peripheral Bluetooth device information displayed on the search screen 220 to execute Bluetooth communication connection.

An exemplary method for registering Bluetooth connection information in a phone book of a portable terminal will now be explained with reference to the accompanying drawings in more detail. The Bluetooth connection information may include Bluetooth device address information BD_ADDR.

Figure 4:
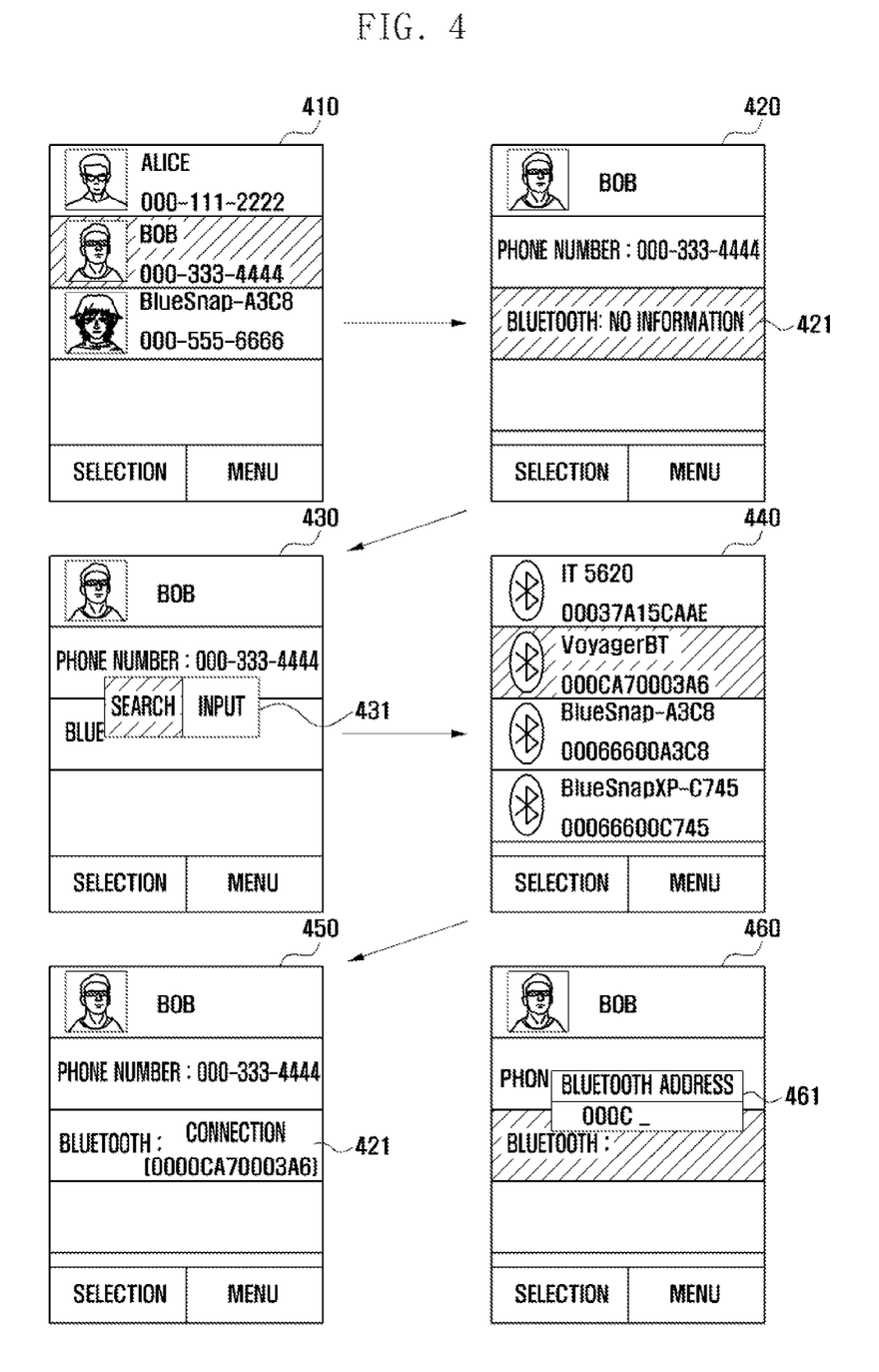
FIG. 4 is a view illustrating a screen registering Bluetooth connection formation in a phone book of a portable terminal according to an exemplary embodiment of the present invention.

FIG. 4 is a view illustrating a screen for registering Bluetooth connection formation in a phone book of a portable terminal according to an exemplary embodiment of the present invention.

Figure 5:
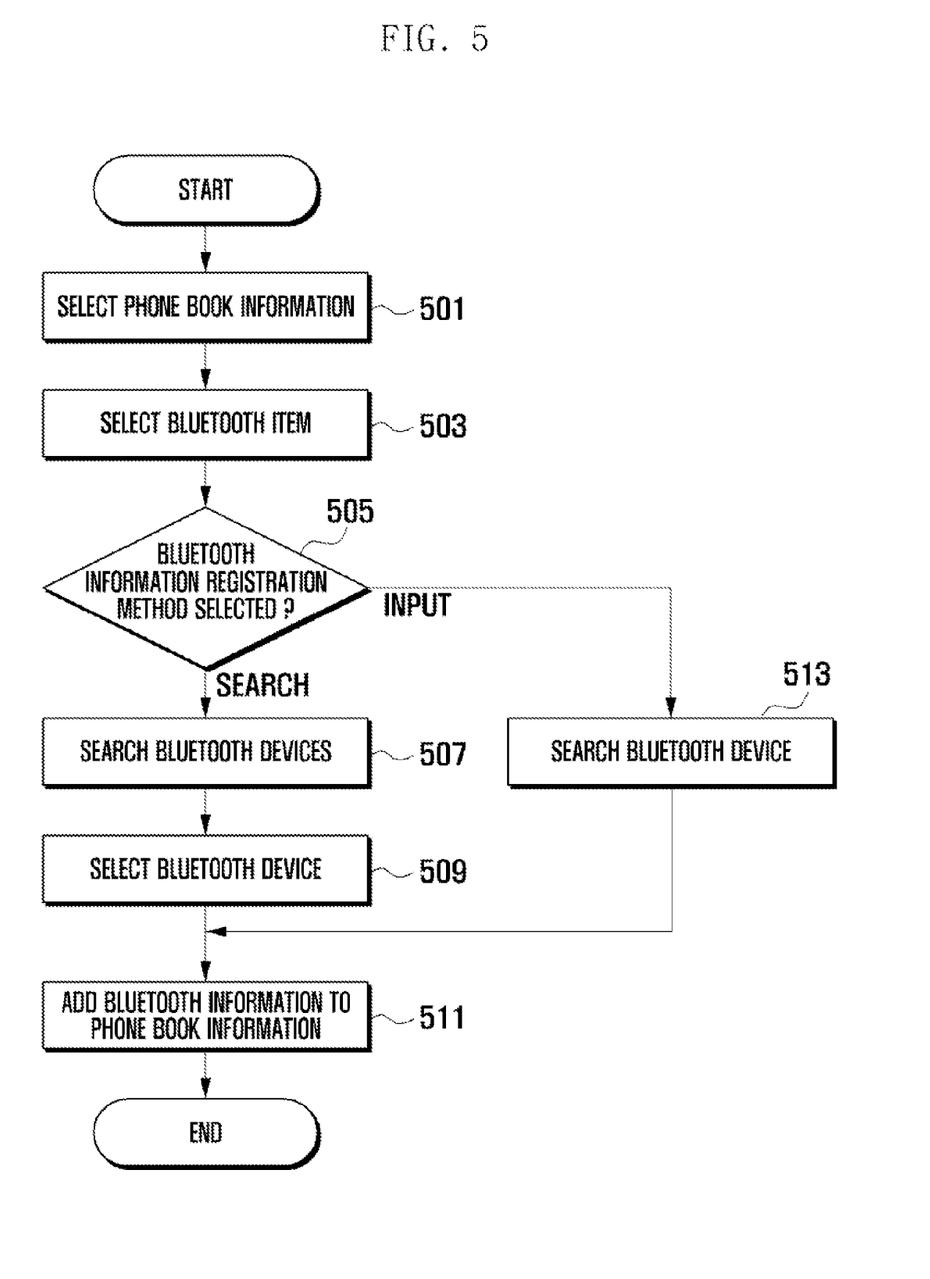
FIG. 5 is a flowchart illustrating a method for registering Bluetooth connection information in a phone book of a portable terminal according to an exemplary embodiment of the present invention.

FIG. 5 is a flowchart illustrating a method for registering Bluetooth connection information in a phone book of a portable terminal according to an exemplary embodiment of the present invention.

Referring to FIG. 4, a screen for registering Bluetooth connection information in a phone book of a portable terminal may include a phone book information selection screen 410, phone book information display screens 420 and 450, an input method selection screen 430, a Bluetooth device search screen 440, and a Bluetooth connection information input screen 460.

The phone book information selection screen 410 is a screen that allows a user to select from phone book information stored in a storage unit through a phone book program of the portable terminal. To do this, the phone book information selection screen 410 may display phone book information stored in a storage unit on a screen. In this case, the user can select phone book information displayed on the phone book information selection screen 410.

The phone book information display screens 420 and 450 are screens that display the phone book information selected from the phone book information selection screen 410 in more detail. The phone book information may contain photograph information, name information, phone number information, Bluetooth connection information, and the like. The phone book information display screens 420 and 450 are divided into a plurality of fields, and the phone book information is allotted by fields to be displayed.

The input method selection screen 430 is a screen that allows a user to add Bluetooth connection information to the phone book information. When a user selects and inputs a Bluetooth connection information field on the phone book information display screen 420 using an input unit, the input method selection screen 430 may display an input pop-up window 431 capable of inputting Bluetooth connection information. There are at least two exemplary methods for inputting Bluetooth connection information. A first method includes searching, by a Bluetooth module, for peripheral Bluetooth devices and selecting, by a user, one of the searched Bluetooth devices. A second method allows a user to directly input the Bluetooth connection information using the input unit. Consequently, the selection pop-up window 431 may include a "search" field if selecting the first method and an "input" field if selecting the second method.

The Bluetooth device search screen 440 is a screen displayed when a user selects a "search" field on the selection pop-up window 431. Information about peripheral Bluetooth devices searched by the Bluetooth module may be displayed on the Bluetooth device search screen 440. The information about peripheral Bluetooth devices may contain names and addresses of the Bluetooth devices. A user may press the input to select one of the information about peripheral Bluetooth devices using the input unit.

The Bluetooth connection information input screen 460 is a screen displayed when a user selects an "input" field on the selection pop-up window 431. The Bluetooth connection information input screen 460 may display an input pop-up window 461 by which a user can directly input Bluetooth information using the input unit. The input pop-up window 461 can include an input field capable of directly inputting Bluetooth connection information by a user using the input unit.

Referring to FIG. 4 and FIG. 5, when a user selects a phone book menu of a portable terminal, a control unit of the portable terminal controls to display a phone book information selection screen 410. When a user selects phone book information displayed on the phone book information selection screen 410 using an input unit in step 501, the control unit may proceed to step 503.

The control unit may control to display a phone book information display screen 420 in step 503. When selected phone book information does not include Bluetooth information, the control unit may control to display a phrase of "no information" in the field 421. At this time, when a user selects the field 421 displaying Bluetooth information using the input unit, the control unit may proceed to step 505.

The control unit may control to display a selection pop-up window 431 capable of selecting a method of inputting Bluetooth information in step 505. The selection pop-up window 431 may include a "search" field and an "input" field. If it is determined in step 505 that a user selects the "search" field of the selection pop-up window 431, the control unit may proceed to step 507.

In step 507, the control unit may control a Bluetooth module to execute an inquiry procedure. Further, the control unit may control to display information regarding peripheral Bluetooth devices acquired by the Bluetooth module through the inquiry procedure on a screen. Namely, the Bluetooth device search screen 440 may be displayed on a screen.

Next, the control unit may receive input selecting information regarding the peripheral Bluetooth devices from a user in step 509. That is, the user may select information regarding the peripheral Bluetooth devices using the input unit. When the user selects information regarding the peripheral Bluetooth devices using the input unit, the control unit may proceed to step 511.

In step 511, the control unit 110 may register address information BD_ADDR of a Bluetooth device selected at step 509 in phone book information selected at step 501. When the user selects an "input" field on the selection pop-up window 431 at step 505, the control unit may register address information BD_ADDR of a Bluetooth device input at step 513 to be described later in the phone book information selected at step 501.

Meanwhile, if it is determined in step 505 that the user selects an "input" field of the selection pop-window 431, the control unit may control to display an input pop-up window 461 capable of directly inputting Bluetooth information using the input unit by the user in step 513. The input pop-up window 461 may include an input field capable of directly inputting Bluetooth information using the input unit by the user.

As mentioned previously, a method for registering Bluetooth connection information in a phone book of a portable terminal according to an exemplary embodiment of the present invention may register connection information of a specific Bluetooth device in phone book information of the portable terminal. Accordingly, upon displaying a search screen for the peripheral Bluetooth devices described in FIG. 2 and FIG. 3, the portable terminal may support the search screen to determine whether a peripheral Bluetooth device searched by the Bluetooth module is registered in the phone book information.

The following is a description of additional exemplary embodiments of the present invention.

Figure 6:
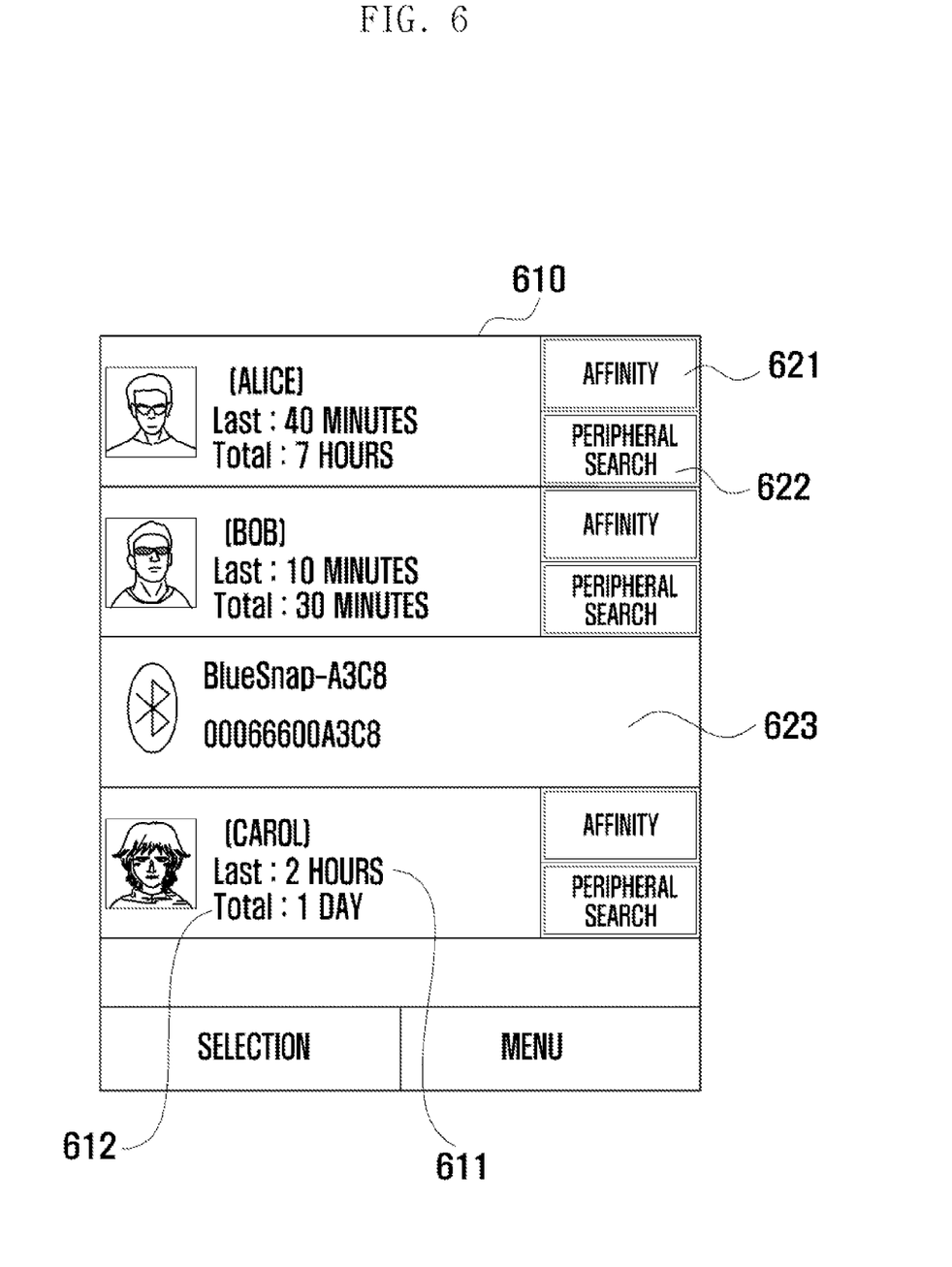
FIG. 6 is a view illustrating an operation screen of an affinity program according to an exemplary embodiment of the present invention.

FIG. 6 is a view illustrating an operation screen of an affinity program according to an exemplary embodiment of the present invention. The affinity program may measure a time when a Bluetooth device is located adjacent to the portable terminal corresponding to phone book information where Bluetooth information is included in the phone book information. A user may select an affinity program menu displayed on a search screen for peripheral Bluetooth devices to execute the affinity program.

Referring to FIG. 6, when the user selects an affinity program menu 621 displayed on a search screen 610 for peripheral Bluetooth devices, the control unit may remove name information and address information BD_ADDR of a Bluetooth device displayed on a field 623 on which Bluetooth device information is displayed, and control to display an adjacent time. In this case, the adjacent time indicates a time when the portable terminal is located adjacent to a corresponding Bluetooth device. Among them, a Last item 611 indicates an adjacent time measured most recently, and a Total item 612 indicates the sum of an adjacent time measured up to the present. The control unit may control a Bluetooth module to periodically broadcast an inquiry signal, for example by selection of peripheral search screen 622, and count the number received inquiry responses from another portable terminal to determine the adjacent time. Namely, the control unit may determine the product of a broadcasting period and the received number of inquiry responses as the adjacent time.

Figure 7:
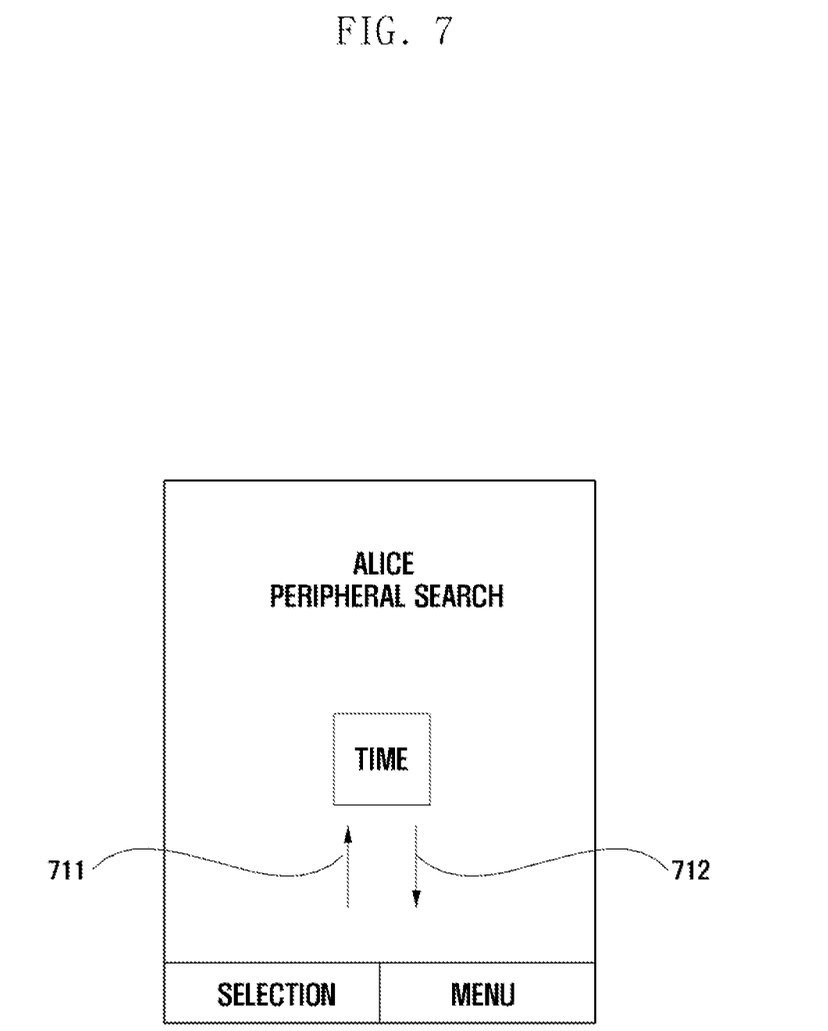
FIG. 7 is a view illustrating an operation screen of a periphery search program according to an exemplary embodiment of the present invention.

FIG. 7 is a view illustrating an operation screen of a periphery search program according to an exemplary embodiment of the present invention. The periphery search program according to an exemplary embodiment of the present invention may measure the presence of an increase or reduction of a spacing distance from a counter-party portable terminal corresponding to phone book information when Bluetooth information is included in the phone book information. The periphery search program can be executed by selecting a periphery search program menu displayed on a search screen for peripheral Bluetooth devices by a user.

When the periphery search program is executed, the control unit may control to display the operation screen of a periphery search program.

Referring to FIG. 7, the control unit may control to display name information of phone book information in which a Bluetooth device address BD_ADDR searching peripheral Bluetooth devices is registered at an upper end of a screen display window. Further, the control unit 110 may control the display unit 130 to display photograph information of the phone book information at a center part of the screen display window.

At this time, the control unit 110 may control the Bluetooth module to periodically broadcast an inquiry signal and measure a Received Signal Strength Indication (RSSI) of the inquiry response signal received from the other portable terminal searching a periphery to measure the presence of an increase or reduction of a spacing distance from a counter-party portable terminal. That is, when the RSSI of the inquiry response signal received from the counter-party portable terminal becomes stronger, the control unit determines that the spacing distance from the other portable terminal is reduced. When the RSSI of the inquiry response signal received from the counter-party portable terminal becomes weaker, the control unit determines that the spacing distance from another portable terminal is increased. When the spacing distance from another portable terminal is increased, the control unit may control to display an upward arrow 711 under photograph information of the phone book information displayed on a center part of a screen display window. When the spacing distance from the other portable terminal is reduced, the control unit may control to display a downward arrow 712 under photograph information of the phone book information displayed on a center part of a screen display window.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A portable terminal, comprising:
   a communication module for transmitting an inquiry signal to perform an inquiry procedure for peripheral devices;
   a storage unit for storing peripheral device information acquired through the inquiry procedure of the communication module and phone book information;
   a display unit for displaying the peripheral device information acquired through the inquiry procedure of the communication module together with the phone book information; and
   a control unit for controlling the communication module to receive and register the peripheral device information from at least one of the peripheral devices, and for controlling the display unit to display the peripheral device information and the phone book information corresponding to the at least one of the peripheral devices when the peripheral device information from at least one of the peripheral devices is registered in the phone book information.

2. The portable terminal of claim 1, wherein the registered peripheral device information is stored with specific phone book information.

3. The portable terminal of claim 1, wherein the control unit directly receives input of the peripheral device information to be added to specific phone book information from a user through an input unit according to a user operation.

4. The portable terminal of claim 1, wherein the control unit receives the peripheral device information from the at least one of the peripheral devices and compares the received peripheral device information with device information registered in the phone book information.

5. The portable terminal of claim 1, wherein the communication module includes a Bluetooth module, the peripheral devices include peripheral Bluetooth devices, and the peripheral device information includes peripheral Bluetooth device information.

6. An operating method for a user interface in a portable terminal, the method comprising:
   registering connection information in a phone book of the portable terminal; and
   displaying peripheral device information and phone book information on a screen indicating a searching result for peripheral devices,
   wherein the displaying of the peripheral device information and the phone book information comprises acquiring the peripheral device information through an inquiry procedure of a communication module of the portable terminal.

7. The method of claim 6, wherein the registering of the connection information comprises:
   selecting phone book information in which the peripheral device information is registered;
   acquiring peripheral device information through an inquiry procedure of a communication module;
   selecting peripheral device information to be registered in the phone book information; and
   registering the peripheral device information in the phone book information.

8. The method of claim 6, wherein the displaying of the peripheral device information and the phone book information further comprises:
   determining whether there is device information registered in the phone book of the portable terminal among the peripheral device information acquired through the inquiry procedure; and
   displaying the device information registered in the phone book and phone book information.

9. The method of claim 8, wherein the displaying of the device information and the phone book information comprises displaying the device information and the phone book information when the device information is registered in the phone book, and displaying only the device information when the device information is not registered in the phone book.

10. The method of claim 8, wherein the displaying of the device information and the phone book information comprises;
    determining whether the amount of peripheral device information displayed on a display unit becomes a maximum searchable number; and controlling the communication module to terminate the inquiry procedure of the communication module when the amount of peripheral device information displayed on the display unit becomes the maximum searchable number.

11. A method for displaying information in a portable terminal, the method comprising:
   performing by the portable terminal an inquiry for peripheral devices;
   determining if a responding device corresponds to information registered in a phone book of the portable terminal; and
   if the responding device corresponds to information registered in the phone book of the portable terminal, displaying the information registered in the phonebook and information regarding the responding device.

12. The method of claim 11, wherein the performing of the inquiry comprises:
   broadcasting at least one of device address information and clock information; and
   varying the broadcast frequency between a plurality of frequency channels.

13. The method of claim 11, wherein the determining if the responding device corresponds to information registered in the phone book comprises determining if an address of the responding device corresponds to the information registered in the phone book.

14. The method of claim 11, wherein the displaying of the information registered in the phonebook and the information regarding the responding device comprises displaying at least one of a photograph and a name corresponding to information in the phonebook and at least one of name information and address information of the responding device.

15. The method of claim 14, further comprising displaying a first menu corresponding to an affinity program and a second menu corresponding to a peripheral searching program.

16. The method of claim 15, further comprising performing the affinity program such that the amount of time during which the responding device is nearby the portable terminal is determined 17. The method of claim 11, further comprising, if the responding device does not correspond to information registered in the phone book of the portable terminal, displaying at least one of an address and a name of the responding device.

* * * * *